Aug. 7, 1934.        H. KOESTER        1,968,893
BELT FASTENER
Filed Sept. 22, 1932
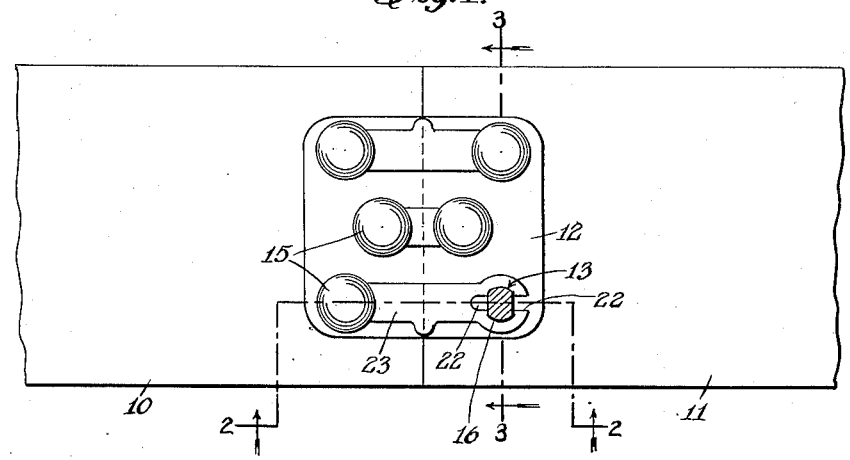
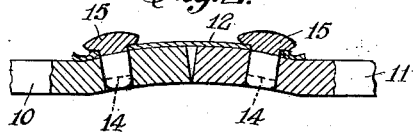
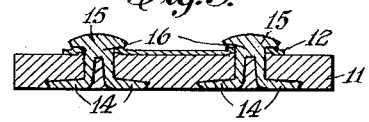
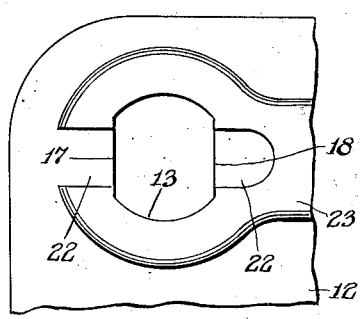
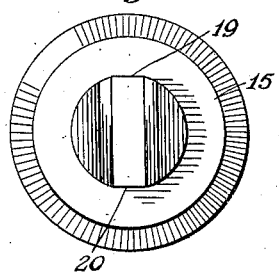
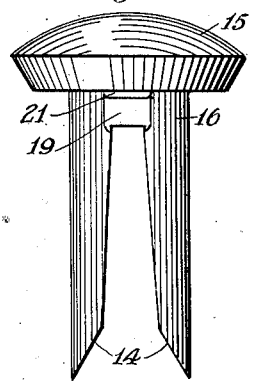
INVENTOR
HERMAN KOESTER
BY
ATTORNEY Patented Aug. 7, 1934

1,968,893

UNITED STATES PATENT OFFICE 1,968,893

BELT FASTENER

Herman Koester, Waterbury, Conn., assignor to The Bristol Company, Waterbury, Conn., a corporation of Connecticut Application September 22, 1932, Serial No. 634,352

2 Claims. (Cl. 24—31)

The invention relates to belt fasteners of the type embodying a plate, adapted to overlap the abutting ends of the belt, and split rivets which fit through openings of the said plate, the prongs of said rivets being adapted to extend through the belt with their ends clinched thereto to secure the parts in place. Such fasteners are particularly suitable for securing together the ends of relatively heavy belts, more particularly thick rubber or web belts such as are used for power transmission or conveyer purposes.

The invention has for an object the provision of a belt fastener of this nature which is so constructed that not only will the rivet prongs be obliged to assume a definite relation to the fibres of the belt when driven therethrough but the shank of a rivet will become securely embedded in the plate through which it has been forced, more particularly in effecting a shearing fit therewith.

Another object of the invention is to provide a belt fastener which is relatively inexpensive and economical in construction, which is strong and sturdy, and which may be very quickly and readily secured in place.

In carrying out the invention, the plate is provided with the required number of openings therethrough and which heretofore were generally circular throughout. In the present instance, however, the openings are provided with a plurality, preferably two, diametrically opposite parallel flats or chordal portions, the spread of the rivet prongs being such that they will pass through a hole only in a predetermined position.

The prongs, therefore, are obliged to be inserted parallel to the shorter axis of an opening and which is made to assume a position parallel to the center line of the belt ends to be united, whereby also the prongs of the rivet will be caused to enter the belt material parallel to and between its fibres which generally run parallel to the center line of the belt.

Furthermore, these flats or chordal portions of the openings will engage the cylindrical shank portion of a rivet as the latter is driven into position and will shear the corresponding wall portions thereof so that a very secure hold between plate and rivet is attained in the resulting shear fit. Depressions or grooved portions, furthermore, may be formed in the plate during its manufacture to accommodate the sheared material.

The nature of the invention, however, will best be understood when described in connection with the accompanying drawing, in which:

Fig. 1 is a plan view of the ends of a belt secured in abutting position by means of the novel fastener, one of which is shown in horizontal section.

Figs. 2 and 3 are transverse sectional views taken on the lines 2—2 and 3—3, respectively, of Fig. 1 of the drawing.

Fig. 4 is a fragmentary detail plan view of one of the openings designed to receive a rivet.

Fig. 5 is an elevation, on an enlarged scale, of a rivet and shows the shear resulting from driving a rivet through a plate opening; and Fig. 6 is an underneath view of the same.

Referring to the drawing, 10 and 11 designate the opposite end portions of a belt to be secured together in abutting relation by means of the novel fastener. This comprises the metal plate 12 having a plurality of perforations or openings 13 therethrough and designed to receive the rivets.

The latter comprise the spread prongs 14, head 15 and an intermediate cylindrical stem or shank portion 16, the prongs being adapted to pass through an opening and to be driven into the belt material and then clinched or turned over in the usual manner transversely to the belt, and as is indicated in Fig. 3 of the drawing.

For well known reasons, it is desirable that the rivets be so applied that the slots between the prongs of a rivet extend lengthwise of the belt thus causing the prongs to enter the belt material substantially parallel to and between the fibres thereof. In order to insure that the rivets are thus applied, the openings 13 in the plate are changed, in accordance with the invention, from the usual circular contour as in the provision of a plurality, preferably two, diametrically opposite and parallel flats or chordal portions 17 and 18, the shorter axis of the opening being positioned parallel to the longitudinal axis of the plate and lengthwise of the belt to which a plate is applied.

By this expedient, the spread prongs of a rivet can be inserted only in one location with reference to the plate, being accommodated by the longer axis of the opening; and this causes the said prongs when driven through the belt material to assume a lengthwise position relative thereto and to become located between the fibres, or approximately parallel thereto. Thereupon the projecting ends may be clinched or turned transversely over the underside of the belt.

Furthermore, in driving down a rivet it is to be noted that its cylindrical portion or shank 16 is of a diameter somewhat greater than the shorter diameter of an opening or distance between the chordal portions 17 and 18. This will cause the corresponding wall portions of the shank 16, as at 19 and 20, to be sheared off, thus effecting a shear fit between plate and rivet which makes for a very secure hold therebetween.

The sheared off material 21 which is thus pushed upwardly toward the underface of the head 15 of a rivet may be accommodated by providing grooves 22 in the upper surface of plate 12 as in embossing ribs 23 longitudinally of the plate with ends about the openings. These ribs, furthermore, serve to stiffen the plate as a whole.

I claim:

1. A device of the character described for connecting adjacent ends of a belt, comprising a metal plate having a plurality of circular rivet openings with diametrically opposite chordal portions and with grooves in the upper surface of the plate adjacent thereto, and split rivets of material softer than the plate and adapted to extend through the openings, each rivet having a solid cylindrical shank portion intermediate its prongs and head and the flat portions being adapted to locate said prongs with reference to the plate when a rivet is inserted through an opening thereof and the shank being of a diameter exceeding the distance between the flat portions, whereby the sides of a rivet in contact with the flat portions are sheared when the rivet is driven into a belt, and the grooves accommodating the sheared material.

2. A device of the character described for connecting adjacent ends of a belt, comprising a metal plate having a plurality of circular rivet openings with diametrically opposite chordal portions, the plate having longitudinal ribs embossed upon its upper surface and about the openings and provided with grooves adjacent the flat portions, and split rivets of material softer than the plate and adapted to extend through the openings, each rivet having a solid cylindrical shank portion intermediate its prongs and head and the flat portions being adapted to locate said prongs with reference to the plate when a rivet is inserted through an opening thereof and the shank being of a diameter exceeding the distance between the flat portions, whereby the sides of a rivet in contact with the flat portions are sheared when the rivet is driven into a belt, and the grooves accommodating the sheared material.

HERMAN KOESTER.